(12) United States Patent
Saiia et al.

(10) Patent No.: US 11,180,429 B2
(45) Date of Patent: Nov. 23, 2021

(54) FERTILIZER COATING METHOD

(71) Applicants: Pursell Agri-Tech, LLC, Sylacauga, AL (US); Huntsman International LLC, The Woodlands, TX (US)

(72) Inventors: Joseph Anthony Saiia, Mountain Brook, AL (US); James Taylor Pursell, Jr., Mountain Brook, AL (US); Stephen Mark Brooks, Sylacauga, AL (US); Leon Roberson, II, Sylacauga, AL (US); Spencer Daniel Sanders, Birmingham, AL (US); Allen Zorn Sanders, Sylacauga, AL (US); Murray Paul Hasinoff, Sylacauga, AL (US); Daniel Paul Heberer, Rochester Hills, MI (US); Justin McLean Fogarty, Waterford, MI (US); Kristopher Michael Modrzynski, Davisburg, MI (US)

(73) Assignees: Pursell Agri-Tech, LLC, Sylacauga, AL (US); Huntsman International LLC, The Woodlands, TX (US)

( * ) Notice: Subject to any disclaimer, the term of this patent is extended or adjusted under 35 U.S.C. 154(b) by 0 days.

(21) Appl. No.: 16/980,526

(22) PCT Filed: Jun. 4, 2019

(86) PCT No.: PCT/IB2019/054628
§ 371 (c)(1),
(2) Date: Sep. 14, 2020

(87) PCT Pub. No.: WO2020/016672
PCT Pub. Date: Jan. 23, 2020

(65) Prior Publication Data
US 2021/0009485 A1   Jan. 14, 2021

Related U.S. Application Data

(60) Provisional application No. 62/680,193, filed on Jun. 4, 2018.

(30) Foreign Application Priority Data

Jun. 13, 2018   (EP) ..................................... 18177506

(51) Int. Cl.
*C05G 5/30* (2020.01)
*C05G 5/40* (2020.01)
(Continued)

(52) U.S. Cl.
CPC ................ *C05G 5/37* (2020.02); *B01J 19/00* (2013.01); *B01J 19/0053* (2013.01);
(Continued)

(58) Field of Classification Search
None
See application file for complete search history.

(56) References Cited

U.S. PATENT DOCUMENTS 3,223,518 A    12/1965   Hansen
3,662,806 A *   5/1972   Ridgway ................. B02C 13/22
                                                    366/219

(Continued)

FOREIGN PATENT DOCUMENTS

CN    201249109 Y    6/2009
CN    204170672 U    2/2015
(Continued)

OTHER PUBLICATIONS

"High Speed Mixers for the Paints and Coatings Industry: an Overview." Prospector Knowledge Center, Jul. 11, 2018, knowledge.ulprospector.com/6238/pc-high-speed-mixers-paints-coatings/. 7 pages.
(Continued)

*Primary Examiner* — Wayne A Langel
(74) *Attorney, Agent, or Firm* — Leason Ellis LLP (57) ABSTRACT

Disclosed is a method of coating fertilizer particles with a coating, the method comprising providing fertilizer particles in a coating unit, one or more steps of applying a coating layer by applying one or more coating components to the fertilizer particles in the coating unit, and at least, partially
(Continued)

curing or hardening the coating layer, wherein said curing or hardening involves a chemical reaction of said one or more coating components, discharging the coated fertilizer particles from the coating unit, optionally after a final cure or hardening step, wherein the coating unit comprises a stationary frame and at least two movable elements.

17 Claims, 2 Drawing Sheets

(51) Int. Cl.
  *C05C 9/00*     (2006.01)
  *B01J 19/00*    (2006.01)
  *C05G 3/40*     (2020.01)
  *B05D 3/10*     (2006.01)

(52) U.S. Cl.
  CPC ............... *C05C 9/005* (2013.01); *C05G 3/40* (2020.02); *C05G 5/30* (2020.02); *B05D 3/108* (2013.01)

(56) References Cited

U.S. PATENT DOCUMENTS

| | | | |
|---|---|---|---|
| 3,991,225 A | 11/1976 | Blouin | |
| 4,113,238 A * | 9/1978 | Hofmann | B01F 9/0007 366/224 |
| 4,711,659 A | 12/1987 | Moore | |
| 4,772,490 A | 9/1988 | Koger et al. | |
| 4,804,403 A | 2/1989 | Moore | |
| 4,854,715 A | 8/1989 | Eirich et al. | |
| 5,238,304 A * | 8/1993 | Zimmermann | B01F 9/0001 366/108 |
| 5,374,292 A | 12/1994 | Detrick et al. | |
| 5,538,531 A | 7/1996 | Hudson et al. | |
| 5,766,302 A * | 6/1998 | Lefroy | C05G 5/37 71/28 |
| 6,001,147 A | 12/1999 | Markusch et al. | |
| 6,080,221 A | 6/2000 | Moore | |
| 6,165,550 A | 12/2000 | Markusch et al. | |
| 6,176,891 B1 | 1/2001 | Komoriya et al. | |
| 6,231,633 B1 | 5/2001 | Hirano et al. | |
| 6,231,895 B1 | 5/2001 | Emanuele et al. | |
| 6,322,606 B1 | 11/2001 | Komoriya et al. | |
| 6,358,296 B1 | 3/2002 | Markusch et al. | |
| 6,364,925 B1 | 4/2002 | Markusch et al. | |
| 6,663,686 B1 | 12/2003 | Geiger et al. | |
| 7,018,440 B2 | 3/2006 | Tabei | |
| 7,018,441 B2 | 3/2006 | Tabei | |
| 7,267,707 B2 | 9/2007 | Rosenthal et al. | |
| 7,416,785 B2 | 8/2008 | Mente | |
| 7,682,656 B2 | 3/2010 | Xing et al. | |
| 7,771,505 B2 | 8/2010 | Ogle et al. | |
| 8,178,161 B2 | 5/2012 | Xing et al. | |
| 8,741,021 B2 | 6/2014 | Ogle et al. | |
| 8,741,022 B2 | 6/2014 | Ogle et al. | |
| 8,790,437 B2 | 7/2014 | Avdala et al. | |
| 8,795,406 B2 | 8/2014 | Maruvada et al. | |
| 8,883,914 B2 | 11/2014 | Apichatachutapan et al. | |
| 8,888,887 B2 | 11/2014 | Hargrove et al. | |
| 9,295,109 B2 | 3/2016 | Gerl et al. | |
| 2002/0145938 A1 * | 10/2002 | Sasaki | B01F 9/0036 366/220 |
| 2005/0197390 A1 * | 9/2005 | Byers | C05G 5/37 514/513 |
| 2006/0115586 A1 | 6/2006 | Xing et al. | |
| 2009/0084149 A1 * | 4/2009 | Van Der Werf | B01J 2/26 71/28 |
| 2013/0305796 A1 | 11/2013 | Hudson et al. | |
| 2013/0305797 A1 * | 11/2013 | Neff | B01J 13/22 71/30 |
| 2014/0033779 A1 * | 2/2014 | Bertin | A01N 25/26 71/64.07 |
| 2014/0290319 A1 * | 10/2014 | Poo Palam | C05F 11/00 71/23 |
| 2014/0298873 A1 | 10/2014 | Garg et al. | |
| 2014/0331727 A1 * | 11/2014 | Hargrove | C08G 18/3206 71/28 |
| 2015/0040630 A1 | 2/2015 | Yang et al. | |
| 2015/0291481 A1 * | 10/2015 | Neff | C09D 175/04 504/347 |
| 2015/0376077 A1 | 12/2015 | Barr et al. | |
| 2017/0096376 A1 * | 4/2017 | Farnworth | C05D 1/00 |
| 2018/0094163 A1 | 4/2018 | Goodwin, II et al. | |
| 2019/0233345 A1 * | 8/2019 | Avgousti | C05G 5/37 |
| 2020/0157013 A1 * | 5/2020 | Haigh | B01J 2/006 |
| 2020/0385316 A1 * | 12/2020 | Uraizee | C05C 9/005 |

FOREIGN PATENT DOCUMENTS

| | | |
|---|---|---|
| CN | 204198630 U | 3/2015 |
| EP | 1379558 B1 | 12/2005 |
| JP | H08277191 A | 10/1996 |
| JP | H11228271 A | 8/1999 |

OTHER PUBLICATIONS

International Search Report and Written Opinion in corresponding International Patent Application No. PCT/IB2019/054628 dated Aug. 19, 2019. 10 pages.
International Preliminary Report on Patentability in corresponding International Patent Application No. PCT/IB2019/054628 dated Aug. 21, 2020. 22 pages.
Eurasian Office Action in corresponding Eurasian Patent Application No. 202092910 dated Jul. 27, 2021. 3 pages.
Australian Examination Report in corresponding Australian Patent Application No. 2019034180 dated May 3, 2021. 3 pages.
Office Action from corresponding Colombian Application No. NC2020/0016519, dated Oct. 8, 2021. 8 pages.

* cited by examiner

FERTILIZER COATING METHOD

CROSS-REFERENCE TO RELATED PATENT APPLICATIONS

This application is a U.S. National Stage Application under 35 U.S.C. § 371 of International Patent Application No. PCT/IB2019/054628, filed Jun. 4, 2019, which claims the benefit of priority of U.S. Patent Application No. 62/680,193 filed Jun. 4, 2018, and European Patent Application No. 18177506.5 filed Jun. 13, 2018, all of which are incorporated by reference in their entireties. The International Application was published on Jan. 23, 2020, as International Publication No. WO 2020/016672 A1.

FIELD

The invention relates to a method of coating particles, and in particular to a method of coating fertilizer particles.

BACKGROUND

Many fertilizers are used as particulate material, and are water-soluble, such as for example urea-containing fertilizers. Controlled release fertilizers can be used to provide for a sustained release of the fertilizer from the particles. Sustained release can contribute to a more efficient use of the fertilizer. Such fertilizers can for example be manufactured by applying a coating to the fertilizer particles. For example US 2014/0033779 describes a method of coating a substrate wherein substrate material and coating material are admixed and the coated mixture is cured in a separate reactor. US '779 also mentions that methods of producing controlled release fertilizers utilizing a single drum or reactor (i.e. batch processing), are functional and commonly used, yet are associated with several problems, such as the risk of generating clumps or balls of coated materials.

U.S. Pat. No. 5,538,531 describes a method of making controlled release particulate fertilizer which involves heating fertilizer particles, agitating the particles such that a gentle mixing is maintained, adding polyol, adding polyisocyanate after the polyol component has spread uniformly, allowing the components to react, and adding a wax.

Furthermore, existing coating methods for fertilizers are relatively expensive especially because the coating step adds a separate process step to the production of fertilizer. The coating step typically requires a long processing time and therefore involves large equipment, which leads to high capital and operational costs. Although a higher price can be acceptable for speciality coatings and for horticulture, low costs are important for broad-acre agricultural crops such as corn (maize).

Therefore, there is a desire for methods for coating particles, in particular fertilizer particles. In particular, there is a desire for methods to coat fertilizers at a competitive price, to produce controlled-release fertilizers that are suitable for efficient fertilization of broad-acre commodity agricultural crops.

An object of the present invention is to provide in an aspect a coating method that addresses the above-mentioned problems and desires at least in part.

SUMMARY

The invention relates in a first. aspect to a method of coating fertilizer particles with a coating, wherein the method comprises:

a) providing fertilizer particles in a coating unit,
b) a step of applying a coating layer (step b) comprising:
applying one or more coating components to the fertilizer particles in the coating unit to provide coated fertilizer particles comprising a coating layer and the fertilizer particles,
and at least partially curing or hardening the coating layer, wherein said curing or hardening involves a chemical reaction of said one or more coating components, wherein step b) is performed one or more times to provide coated fertilizer particles, and
c) discharging the coated fertilizer particles from the coating unit, or performing a final cure or hardening of the coated fertilizer particles in the coating unit and subsequently releasing the fertilizer particles from the coating unit, wherein the discharged fertilizer particles comprise said coating, wherein the coating preferably comprises a water-insoluble polymer,
wherein the coating unit comprises a stationary frame and at least two movable elements, wherein said movable elements are independently movable with respect to the frame, and wherein the method comprises moving said at least two movable elements with respect to the frame during at least step b).

DETAILED DESCRIPTION

The present invention broadly provides the judicious insight of combining a short residence time in a coating unit wherein the particles to be coated are kept in motion, with a coating unit comprising two movable elements, and preferably furthermore with a coating composition having a short curing or hardening time.

The invention provides for a method that involves carrying out a chemical reaction of the one or more coating components in that coating unit, while the particles are kept in motion, in order to at least partially cure or harden the coating. Advantageously this allows for high throughput and a fast coating process without agglomeration of the fertilizer particles and without the formation of solid deposits in the coating unit.

The invention pertains to method of coating fertilizer particles. The fertilizer particles can also be referred to as granular fertilizer. The particles to be coated and/or after coating have for example a particle size of 0.10 to 20 mm, such as 0.5 to 15 mm or 1.5 to 5 mm. The particles for instance have a weight average particle size in this range or for instance wherein at least 90 wt. % of the particles have a particle size in this range, wherein the size of a particle refers for example to the minimum size. The particles are for instance granulated or prilled fertilizers, or pelletized, pastilled or compacted fertilizer material. Optionally, the method comprises a step of solidifying a liquid fertilizer material into the fertilizer particles to be coated, such as with a prilling tower, a granulation unit (e.g. with a spouted bed or with a fluidized bed) or with a pelletizer, especially if the fertilizer is a urea fertilizer or a urea-containing fertilizer. Preferably, in this solidification step, a melt (such as urea melt) is cooled, for instance using cooling air. Preferably, the particles are kept at a temperature above 50° C. or above 60° C. between the solidification step and the coating step.

The particles to be coated comprise (or consist) of fertilizer material. The fertilizer material is for instance a nitrogen fertilizer material and comprises for instance nitrogen (based on N atoms) in an amount of at least 10 wt. %, at least 20 wt. % or at least 30 wt. %. The fertilizer material can for instance comprise urea and/or ammonium salts, such as ammonium sulphate and ammonium nitrate, and comprises for example less than 10 wt. % or less than 5 wt. % of components other than urea and ammonium salts. Preferably, the fertilizer material comprises urea, such as at least 50 wt. % urea, and preferably is a urea fertilizer having at least. 40 wt. % N or at least 46 wt. % N. The fertilizer material can also comprise K (potassium), Ca (calcium), P (phosphor) and/or S (sulphur) (based on elemental composition), for instance as sulphate and/or phosphor salt, optionally in combination with N for instance as urea and/or ammonia. The fertilizer material is typically water-soluble, such that when the fertilizer particles are applied on the land, the fertilizer elements (such as N, P and S, K, Ca) are provided to the crop as dissolved species, and optionally in addition Zn and/or other micronutrients are provided.

The method of the invention pertains to coating fertilizer particles with a coating. Accordingly, the coated particles (as obtained after the coating method) comprise the fertilizer particles and an outer layer of coating material which covers the fertilizer particles partly or entirely.

The coating layer provides for example for controlled release of fertilizer material especially when the fertilizers are applied on the land (in the soil) and are in contact with water. The coating layer may also provide for slow release of fertilizer material. In such embodiments, fertilizer material is released from the particle e.g. by hydrolysis, by biodegradation, or by limited solubility, or by a combination thereof. The fertilizer material that is released refers to the release of nutrients available to a plant.

The coating preferably comprises a polymer and more preferably comprises a water-insoluble polymer. The polymer for instance has a solubility of less than 0.10 g/L in deionized water at 100 kPa and 20° C. The polymer is for instance not soluble at 20° C. in deionized water using the method given in D. Braun et al., Practical Macromolecular Organic Chemistry, CRC Press, 1984, p. 73 wherein 30-50 mg samples of finely divided polymer are placed in small test tubes with 1 ml liquid and allowed to stand for several hours.

The coating material is for instance water-impermeable, or semipermeable. Preferably, the coating material protects the fertilizer inside the coating from soil processes until released.

In some embodiments, water and solutes can permeate through the coating by diffusion. The time required for diffusion can provide for a desired release rate of fertilizer nutrients from the coated particles into the soil. In this way the coating can provide for controlled release.

In some embodiments, the coating material is semipermeable (e.g. permeable for water but impermeable for the fertilizer material such as urea) and upon application on the land, water enters through the coating due to osmosis, causing swelling of the fertilizer material core. This can result in the coating cracking open and or in movement of fertilizer material through pores in the coating. In this way sustained and/or delayed release of the coating material can be achieved.

The coating material is for instance in total at. least 0.0010 wt. %, such as 0.10 wt. % to 10 wt. % based on the total particle weight., and/or is for example 0.2-5 wt. %, or 0.3-3.0 wt. %, or 0.3-1.5 wt. %, or 0.5-1.2 wt. % per coating layer, such as 1.0 to 3 wt. % per coating layer. The coating thickness is for example in the range of 1.0 μm to 50 μm, in total and/or or per coating layer, although other thicknesses are also possible.

The coating material, as present in the coated particles, is for example polymeric, and the coating composition as applied to the fertilizer particles during the coating method is for example a resin.

Preferably, the coating of the particles, as released from the coating unit, comprises a polymer. Preferably the polymer is crosslinked. Preferably the polymer is thermoset, alternatively thermoplastic.

The method involves providing fertilizer particles in a coating unit, for instance the particles are fed into the coating unit, in particular into a rotating container. The coating unit is configured for receiving fertilizer particles to be coated. The coating unit comprises for instance a container for receiving and holding fertilizer particles. Such container preferably has a wall and an interior space, wherein the interior space is capable of receiving fertilizer particles.

The method may comprise screening fertilizer particles to a desired size range before introducing the fertilizer particles into the coating unit.

The method may furthermore comprise pre-heating the fertilizer particles before they are introduced into the coating unit, such as to a temperature of at least 30° C., at least 40° C., at least 50° C. or at least 60° C., and/or a temperature at least 5° C., at least 10° C. or at least 20° C. above ambient temperature, and typically to a temperature of less than 100° C. or less than 80° C.

The method comprises a step of applying a coating layer. This step can be performed one or more times to provide coated fertilizer particles having one or more coating layers.

A step of applying a coating layer involves providing fertilizer particles with a coating layer. The step comprises applying one or more coating components to the fertilizer particles while the particles are in the coating unit. In addition other compounds can be applied to the fertilizer particles during such step of applying a coating layer, such as solvents, although in preferred embodiments no solvents are used. The method may also involve additional steps of applying additional coating layers to the particles, such as steps wherein wax layers are applied. In the specified step of applying a coating layer, the coating components and optional further compounds can be applied for instance simultaneously or subsequently. For instance, at least two coating components are applied subsequently, such as stepwise, wherein the coating components have a different composition. Each coating component can also be a mixture of compounds. The coating components are applied typically as liquid (this can include for instance emulsions, solutions, and dispersions, as well as polymer melts), e.g. by injection such as by spraying the liquids. In this way fertilizer particles are provided comprising a coating layer and the fertilizer particles as core. Accordingly the applied one or more coating components are present as (further) layer on the fertilizer particles.

In preferred embodiments, at least one or all of the coating components when applied have a viscosity of less than 2000 or less than 1000 mPa·s at 25° C. and typically more than 100 mPa·s at 25° C. Viscosity is for instance measured according to ISO 3219:1993.

Preferably the one or more coating components are added to a bed of the fertilizer particles, wherein the bed is provided by the motion of movable elements of the coating unit, in particular by rolling action or by particle-to-particle contact. Preferably, the bed is a lifted particles bed, wherein fertilizer particles are lifted by the motion of movable elements. The coating unit is preferably operated such that all material in the interior space is kept in constant motion. Preferably, the coating unit is operated such that airborne particles are continually moved in multiple directions. In some embodiments, the coating steps are carried out in an atmosphere other than air, e.g. an inert atmosphere such as $N_2$. The coating unit is for instance operated such that at least some particles are "gasborne" particles (e.g. airborne particles) and wherein these particles are typically continually moved in multiple directions. This may help to overcome effects of gravity and may negate limitations of particle size, shape and density to achieve homogeneous mixing of the coating components with the particles in short mixing cycles.

The fertilizer particles are for instance introduced in the container in an amount of more than 10% or more than 20% or more than 40% or more than 60% and/or less than 95% or less than 90% or less than 80%, such as 60-90%, preferably 75-90%, all by volume of the interior space of the container, based on the bulk density of the material of the uncoated fertilizer particles. The volume fraction based on bulk density means that a bulk bed of the uncoated particles (including void space in the bed) occupies said volume fraction of the interior space. For instance for urea particles or urea-containing particles a bulk density of 720-820 kg/m$^3$ can be used, e.g. 770 kg/m$^3$. The fill fraction based on true density of the fertilizer material (without coating) is for instance more than 10% or more than 20% or more than 30% and/or less than 60% or less than 50% of the interior space volume. This filling fractions can contribute to the formation of a lifted bed during step b) and to good distribution of the coating components.

Preferably the coating components are solvent-free, e.g. comprise less than 5 wt. % water, such as less than 1.0 wt. % water and less than 5 wt. % or less than 1.0 wt. % of organic solvents, wherein organic solvents are for instance organic compounds having a boiling point lower than 120° C. Preferably in the entire method less than 1.0 wt. % water and/or less than 1.0 wt. % organic solvents are applied, based on weight of the fertilizer particles without coating. Water is preferably avoided because many fertilizers are water soluble. Organic solvents are preferably avoided to avoid the risk of emissions and to comply with emission standards and other regulations.

Preferably, the coating components comprise less than 40 wt. % or less than 20 wt. % or less than 10 wt. % of components other than reactants for the chemical reaction to be carried out during step b). Preferably, each coating component comprises more than 50 wt. % or more than 80 wt. % of reactant for the chemical reaction to be carried out for the curing or hardening. Preferably, each coating component comprises less than 10 wt. % of compounds which are not included in the coated fertilizer particles as discharged.

In embodiments wherein one or more of the coating components comprise or are a polymer, the polymeric coating components are preferably applied as a liquid, such as a polymer melt, e.g. at a temperature sufficiently above the glass transition temperature of the polymer such that the polymer has is sufficiently low viscosity that it can be processed.

The method furthermore involves at least partially curing or hardening the applied one or more coating components. This at least partial curing or hardening is carried out in the coating unit, and for instance ensures that the final coating comprises the preferred water-insoluble coating.

The curing or hardening comprises a chemical reaction of the one or more coating components. This chemical reaction is carried out in the coating unit and more in particular while at least one of the movable elements is in motion. The chemical reaction for instance provides for an increase in the viscosity of the coating layer. In some embodiments, the chemical reaction involves the formation of compounds with higher molecular weight than the reactants. The chemical reaction for example involves polymerization and/or crosslinking of polymers.

In case of partial curing or hardening in step b), a final cure or hardening is carried out subsequently, before and/or after discharge of coated fertilizer particles from the coating unit. A final cure is for instance carried out in a coating unit as used for step b).

The hardening and curing can comprise solidification of one or more liquid coating components added to the fertilizer particles into a solid coating material by a chemical reaction of the one or more coating components. In case of curing, the chemical reaction comprises for example a crosslinking reaction to give a thermoset polymer. In case of hardening, the chemical reaction typically does not involve crosslinking, and the chemical reaction typically yields a thermoplastic polymer. In an embodiment wherein only one coating component is applied, this component can react with itself, e.g. in a polymerization reaction.

In view of the reactive curing or hardening, the one or more coating components for example include initiators and/or catalyst, such as polymerization initiator (e.g. free radical initiator or cationic initiator) and polymerization catalysts.

The coated fertilizer particles and/or the coating material may comprise additional components. The additional components include for example one or more selected from the group consisting of wetting agents, surfactants, biocides, herbicides, insecticides, fungicides, antistatic agents, and micronutrients. The micronutrients are e.g. selected from the group consisting of Fe, Mn, Zn, Cu, Mo, Ni, Cl, Mg, and B.

Such additional components are for example applied during the one or more steps of applying coating layers, for instance as part of the one or more coating components or as additional component added during step b) and/or step c).

The coating can include wax, which is for instance applied as layer between coating layers that are cured or hardened during step b) and/or as final layer. The wax is for example an olefin wax, more preferably an alpha-olefin wax, such as with at least 20 or at least 30 carbon atoms, or for instance a hydrocarbon (such as alkane) with for example 20 to 40 carbon atoms. The wax is for instance a paraffin wax, petrolatum wax, or polyamide wax, and/or is for example a micro crystalline wax.

The method furthermore comprises discharging the coated fertilizer particles from the coating unit, optionally after a final cure step or final hardening step. A final hardening step may for instance comprise evaporation of unreacted monomer, or cooling, and/or a final hardening chemical reaction step. An optional final cure step may comprise allowing the coating components present in the applied coating layers to react further. The final curing step may involve crosslinking of polymeric coating material. The discharged fertilizer particles comprise the coating and the coating material. The optional final hardening step is applied to bring the particles in condition for discharge, in particular non-sticky, having sufficient mechanical/crushing strength to be handled, packaged and stored.

The method optionally comprises one or more steps after the release of the coated fertilizer particles, such as a cooling step, a packaging step, a metering step, and/or a storage step. The cooling step for instance uses cooling air. The coated fertilizer particles are for example suspended in cooling air. The packaging step for instance comprises packaging fertilizer particles in bags or containers. A metering step may involve dividing a stream of coated fertilizer particles in batches of a metered amount, such batches may for instance be transferred to a vehicle or a ship with or without packaging.

The coating method is for example carried out as batch process or as continuous process. The method is for example a batch process which for instance results in multiple coating layers, wherein two or more steps of applying a coating layer are carried out in the same coating unit (e.g. in the same container). Also for a batch process, the one or more components can be added continuously over e.g. at least 10 seconds or at least 30 seconds. In an example process, two or more batch coating units are operated in a parallel, with the parallel coating units carrying out different steps from each other at each time. In such embodiment the method is carried out in so-called batch-continuous or semi-continuous mode. For instance, the method can involve filling a first coating unit with fertilizer particles while a second coating unit carries out another step of the method than filling. In this way with two or more coating units in parallel, a continuous feed of fertilizer particles can be processed with at any time at least one of the parallel coating units receiving non-coated fertilizer particles. In such embodiment, the method involves for instance applying the total number of coating layers to be applied on the fertilizer particles (such as 1, 2, 3 or more layers) in a single one of the parallel coating units.

In an example embodiment wherein the method is carried out as a continuous process, two or more coating layers are applied in different coating units as described herein arranged in series, each coating unit for instance having a container and a rotor, wherein the method comprises transporting fertilizer particles from a first coating unit for applying a first coating layer to a second coating unit for applying a second coating layer. Such transporting can for instance be carried out with a moving belt, or for example coating units are placed on top of each other and transporting is carried out by gravity. The continuous process may involve continuous supply of fertilizer particles to a first coating unit and transfer of fertilizer particles having a coating layer from the first coating unit to a downstream second coating unit and withdrawal of fertilizer particles having an additional coating layer from the second coating unit. In some further embodiments, two or more coating units as described are used in series, wherein different coating layers are applied stepwise in different of said coating units, and wherein the transportation involves transporting batches of coated fertilizer particles at least from a first coating unit to a downstream second coating unit.

The coating unit comprises a stationary frame and at least two movable elements, including a first and a second movable element. The coating unit is capable of receiving fertilizer particles to be (further) coated. The movable elements are configured for moving the fertilizer particles during the coating process. The first and second movable element can each move with respect to the frame, and can typically be moved with respect to the frame in an independent way. The method comprises moving the at least two movable element with respect to the frame during at least step b), preferably while in contact with fertilizer particles. Preferably, the first and the second movable element are also moved with respect to each other. The first and the second movable element are for instance moved independently from each other and independently with rotating and/or reciprocating motion.

The movement of the movable elements may provide for movement of the fertilizer particles during step b). This can contribute to good mixing of the added one or more coating components with each other and with the fertilizer particles. Moving the movable elements may also avoid or prevent the formation of clumps during the coating process, such as clumps of coating material and fertilizer particles.

The stationary frame is used for mounting the movable elements and for instance actuators such as motors. The stationary frame may include a static case.

Preferably, the first movable element, comprises a container or is a container. The container has a wall and an interior space. The wall has for instance a bottom part and one or more side parts. The wall can be provided with a closable outlet opening for instance at the bottom part for discharge of coated fertilizer particles. The container is for instance closed at the top with a cover plate that is part of the coating unit. The cover plate may include an inlet opening for fertilizer particles and is for instance provided with one or more spray nozzles for one or more coating components. The inlet opening can also be provided by an open pipe. The open pipe is for instance used for dripping the coating components into the particles bed. The interior space is used in the method for accommodating the particles, for instance by receiving and holding fertilizer particles in free space of the interior space. During the method, the container is for instance rotated and/or provided with a reciprocating movement, with the rotation or reciprocating movement e.g. in a horizontal or vertical direction. The method involves for example spinning the container around a rotation axis while the container holds the fertilizer particles, in particular inside the interior space. Preferably at least step b) is carried out during said spinning. The spinning of the container provides for instance for rolling of the fertilizer particles during step b). Preferably, the particles are continuously kept in motion in the container until discharge, such as by rotating the container.

The container is for instance cylindrical and is for instance a pan. The container has for instance a circular cross-section in a plane perpendicular to the rotation axis. The container is for instance connected to a first actuator, such as a motor. The first actuator is e.g. provided in the frame and configured for movement of the container relative to the frame.

The coating unit may furthermore comprise a scraper that is for instance stationary with respect to the frame, or e.g. can be kept stationary with respect to the frame while the container spins. The scraper can be used for scraping solid materials from the rotating container wall. The scraper can also contribute to agitation of the particles during operation. The scraper is arranged in the proximity of the container wall and/or the container bottom (e.g. a gap of 1-10 mm, such as 1-5 mm), and is preferably arranged on the upper side of the preferred inclination of the container. The scraper is movable relative to the container wall. In a preferred embodiment, the container has a bottom and a side wall, wherein the coating unit furthermore comprises a scraper, the scraper being stationary with respect to the frame during at least step b), wherein the scraper is arranged to scrape material from the side wall and/or from the bottom of the container.

In a preferred embodiment, the second movable element is or comprises an agitating member. The agitating member is arranged in the interior space of the container and is for instance configured for rotating and/or reciprocating movement in the interior space. The method preferably comprises moving the agitating member during at least step b) and simultaneously with spinning the container and more preferably continuously during step b). In this way, the agitating member is in contact. with the fertilizer particles during step b) when the particles are provided with the one or more coating components. The agitating member is for example a mixing tool. The movement of the agitating member can contribute to mixing of the particles and/or helps to avoid the formation of clumps. In some embodiments, the agitating member is for example arranged for keeping a large part (e.g. more than 30% by number) or a majority of the particles suspended in air (without contact, with the container) at any given time during step b). The individual particles bounce for instance to and from the container wall and the agitating member during step b).

The agitating member is for instance connected to an actuator, such as a second actuator provided in the frame for motion of the agitating member relative to the frame, wherein the motion can be rotation. The speed and movement of the agitating member can preferably be controlled independently of the speed and movement of the container.

More preferably, the agitating member is a rotor. The rotor comprises for instance a shaft and one or more blades. The blades can be provided as paddles. The blades or paddles are preferably angularly evenly spaced around the shaft. The method comprises for example rotating the rotor around a rotation axis of the rotor simultaneously with spinning the container during at least step b). One container can be provided with one or more rotors. The rotor is preferably rotated around the shaft. The rotation axis of the rotor is for example substantially parallel (including parallel) with the rotation axis of the container. The rotation axis of the rotor has for instance an included angle of less than 30° or less than 20° or less than 5°, e.g. 0°, to the rotation axis of the container. The shaft may extend through a hole in a cover plate of the container. For instance, the rotor is mounted above the container in the frame and hangs in the container.

The container and the rotor can be rotated with the same or opposite direction of rotation (at any given time), especially if the shaft and rotation axis are substantially parallel. Opposite direction of rotation is preferred. For instance, seen from above with respect to gravity, the container may rotate in clockwise direction and the rotor in counter clockwise direction, or vice versa.

The container is rotated at a speed of for example at least 1 rpm (rotation per minute), typically less than 500 rpm, preferably 5 to 100 rpm, such as 10 to 60 rpm. The rotor is rotated at for example at least 1 rpm (rotation per minute), typically less than 500 rpm, preferably 5-100 rpm, such as 10-60 rpm. The tip speed is for instance 0.10- to 1 m/s for the container, preferably 0.2-2.0 m/s or 0.5-2.0 m/s. The tip speed is for instance 0.2-10 m/s for the rotor, preferably 0.5-5.0 m/s or 1.0-2.5 m/s. The tip speed of the rotor is preferably higher than the tip speed of the container. These preferred speeds apply in particular for step b).

The rotation axis of the rotor is preferably spaced apart. from the rotation axis of the container (at least in a plane perpendicular to the rotation axis of the container), such that the rotor is mounted eccentrically in the interior space of the container, especially in embodiments wherein the rotation axis of the rotor is for example substantially parallel (including parallel) with the rotation axis of the container. The spacing is for instance by a distance of at least 2% or at least 5% of the diameter of the interior space in the plane perpendicular to the rotation axis of the container. In some embodiments a single container can optionally be provided with a plurality of rotors. The rotation axis of the rotors of the plurality of rotors are for instance at the same distance or at different distance (in the radial direction) from the rotation axis of the container.

In a preferred embodiment, the rotor comprises a shaft and one or more blades. The shaft has a length in the length direction a first end and a second end, wherein said first end is arranged in said interior space of said container. The blades are also arranged in that interior space. The second end is connected to an actuator, e.g. a second actuator, for instance in a second motor. The blades are connected to the shaft and extend from the shaft in said interior space of the container in a direction perpendicular to the length of the shaft. The blades have for instance a length in the direction perpendicular to the shaft of at least 2% or at least 5% of the radius of the container in the cross-section perpendicular to the rotation axis of the container.

Preferably, the rotation axis of the container is inclined with respect to a vertical direction, wherein the vertical direction is defined with respect to gravity. Preferably, the rotation axis has an angle of at least 5° or at least 10° with respect to the vertical direction, and typically less than 30°. The rotation axis can also be vertical with respect to gravity. The vertical or slightly inclined orientation may provide for a homogeneous (substantially angularly symmetric around the rotation axis) distribution of the particles in the container compared to an embodiment wherein the rotation axis is horizontal or nearly horizontal. In case of inclined rotation axis, the frame comprises a casing wherein the container is arranged on a supporting element such that the rotating container is inclined with respect to a horizontal plane, the horizontal plane being parallel to the bottom of the supporting element. Preferably, the container has a bottom wall provided by a flat plate, for instance a cylindrical plate. Preferably the bottom wall is mounted in the frame with an angle of at least 5° or at. least 10° with the horizontal plane. For instance a cylindrical bottom wall can have a lowest point when in standstill (not rotating). An outlet duct. for discharge of coated fertilizer particles is for example provided at that lowest point or for example in the center of the bottom wall. The inclined rotation may also contribute to better mixing of the fertilizer and the added one or more coating components.

In some embodiments, the coating unit comprises a plurality of coating devices, arranged in series or in parallel, wherein each coating device comprises a container and at least one rotor. For example, the coating unit comprises a plurality of coating devices, arranged in series and connected with each other with transport lines for coated fertilizer particles (such as moving belts or ducts), wherein each coating device has one container. Each container has for instance an inlet and outlet for (coated) fertilizer particles. Such coating unit can for instance be used in methods wherein step b) is carried out two or more times. Each coating layer is for instance applied in a different coating device (and in a different container), wherein in each container for instance not more than one coating layer is applied. Fertilizer particles are provided to the most upstream of the coating devices and discharged from the most downstream coating device. The last coating device is for instance used for performing a final cure rather than for applying a coating layer. In another embodiment, a coating system is used with a plurality of coating units in parallel, and with a common cooling stage downstream of the coating units.

According to the present invention, the coating unit is for instance an Eirich mixer, for example an Eirich Intensive Mixer Type R, or for instance a plurality of such mixers arranged in parallel or in series. According to the present invention, the coating unit is for example a mixing device as described in in U.S. Pat. No. 4,854,715 or as described in U.S. Pat. No. 9,295,109.

The coating unit can for instance also be a horizontal mixing system as available from Lodige, or for instance an Eirich Plow Blender. The coating unit is for example a mixing device with a horizontal cylindrical tank and a solid horizontal shaft., with wedge-like plows or angled paddles mounted on the shaft, for instance an Eirich Plow Blender.

In a preferred embodiment, in step b) a coating layer is applied in an amount of 0.10 wt. %-6.0 wt. %, more preferably 0.50-4.0 wt. %, even more preferably 0.5-1.5 wt. % based on the weight of the fertilizer particle to be coated without coating. If step b) is performed two or more times, for example to give coating layers with different compositions, these amounts and times refer to one instance of step b). For example the total coating is 1.0 to 25 wt. %, or 1.0 to 15 wt. %, or for example 1.5 to 10 wt. %, preferably 1.5-7.5 wt. %, based on weight of the fertilizer particles to be coated without any coating.

Preferably step b) is carried out (and completed) in 10 to 600 seconds, preferably in 30 to 240 seconds or 10-120 s, or 30-120 s, or 10-60 s, or 10-30 s, or 30-90 s, in particular for such amounts of coating material. In some embodiments, a coating component is added to the container in 0.5 to 30 s, or 1 to 10 s, or 1 to 5 s, and preferably the entire amount of such a coating component, preferably each coating component, is added in such period. In some embodiments, the component is distributed over the fertilizer particles (i.e. mixed with the particles) in 10 s to 45 s, or 10 to 30 s. Such fast mixing times are for instance achieved by the motion of a container and rotor, when used.

If step b) is performed two or more times, for example to give coating layers with different compositions, these times refer to one instance of step b). Preferably, the final cure of step c), if carried out, is carried out (and completed) in 60 seconds to 15 minutes, more preferably 2 to 10 minutes. Preferably step b) involves applying two or more coating components subsequently and stepwise to the fertilizer particles while both the container and the rotor are rotating. Preferably the coating component added first to the particles has a higher molecular weight (such as number average molecular weight) and/or higher viscosity than the second coating component. Preferably the first coating component is added to the particles and mixed for 2-120 seconds, such as 10-60 seconds, and then the second coating component is added. The mixing of the first coating component preferably provides for a homogeneous distribution of the coating component over the particles at the end of the mixing period and before the second coating component is added. Preferably both coating components are injected as liquids (which can include dripping and spraying) and preferably to a bed of lifted particles. In a preferred embodiment, the bed of lifted particles contains a zone wherein the particles move the fastest (e.g. close to the rotor) and the coating component is added to that part. This may provide for achieving even distribution of the coating component over the particles quickly. In some embodiments, the first two coating components which are added are reactive with each other. After the one or more reactive coating components are applied, the method may involve allowing the coating components to react. with each other for instance for a period of 10 to 300 seconds, such as 10 to 120 seconds, while the particles are kept in motion. An advantage of the present invention is that this reaction carried out in the coating unit may provide for curing or hardening of the particles without agglomeration of the coated particles.

Carrying out the reaction in the coating unit, preferably in the rotating container with rotor, was found to provide for rapid and complete distribution of the coating components. The distribution also provides for complete encapsulation of the fertilizer particles with the coating layer. The rapid distribution also enables the use of coating components with faster reaction speed, at the same time the faster reaction speed is important for achieving a high quality of the coating in such a coating unit. In particular, both a reaction speed that is too high and a reaction speed that is too low can cause a too high release rate of nutrient from the coated fertilizer particles. Furthermore it was found that the formation of clumps in the coating unit is avoided by the motion of the movable elements (e.g. the container and the rotor).

After such a reaction time, one or more further coating components can be added such as a wax, preferably a liquid wax that is injected into the fertilizer bed. Preferably a wax is applied between coating layers. These steps are optionally repeated one or more times in the same container or in further containers in series, in order to obtain multiple coating layers and are optionally followed by a final cure stage. A final cure stage is carried out (and completed) in e.g. 60 seconds to 15 minutes, such as 2 to 10 minutes, preferably 2 to 5 minutes, to ensure complete hardening or curing of the coating layer. Optionally a final additional coating layer is applied such as a wax layer. The final cure can be carried out in the same rotating container or in a different part of the coating unit. The final cure is typically stopped by discharge of the coated fertilizer particles.

Preferably, step a) and step b) are carried out at a temperature of at least 10° C., 30° C., at least 40° C., at least 50° C., at least 55° C. or at least 60° C., typically less than 120° C., or less than 80° C., such as in the range of 40 to 120° C. or 50 to 100° C., more preferably 55-80° C. Preferably, the fertilizer particles are maintained at such a temperature during the entire residence time in the coating unit. Preferably, the particles are at least 50° C. or at least 60° C. when discharged from the coating unit. The method may involve cooling the discharged particles from a temperature of at least 50° C. or at least 60° C. to a lower temperature, e.g. below 30° C. In some embodiments, the method comprises a pre-heating step of solid fertilizer particles. In some other embodiments, the method involves obtaining fertilizer particles as formed by solidification at such temperatures (e.g. as formed during granulation or prilling) and transporting the urea particles at such temperatures (e.g. above 50° C.) from the solidification unit. to the coating unit. Maintaining the particles in the coating unit above 50° C. or above 60° C., in particular during the entire residence time, may contribute to a high speed of the reactive curing or reactive hardening of the coating components, for instance if a polyurethane coating is used. Other coating components may already react sufficiently fast at lower temperatures such as 10 to 50° C. Furthermore maintaining the particles below 80° C. or even below 60° C. or below 50° C. can be beneficial if the coating includes additional components which are liable to degradation or undesirable side reactions at high temperatures. The coating unit preferably operates at 0.010 to 10 bar absolute, such as 0.5 to 2.0 or 0.5 to less than 1.0 bar absolute (slight vacuum).

In a preferred embodiment, the coating is a polyurethane coating. Preferably, the coating components include a polyisocyanate and a polyol. Preferably the polyisocyanate has 2 or more isocyanate groups per molecule. The polyisocyanate is for instance aliphatic or aromatic, preferably aromatic. The polyisocyanate is for instance a diisocyanate having exactly two isocyanate groups. A particularly useful polyisocyanate is methylene diphenyl diisocyanate (MDI), such as 4,4'-MDI, another example is toluene diisocyanate (TDI). An aromatic polyisocyanate is for instance used as a blend of polymeric and di-isomers of the isocyanate.

The polyol has at least 2 hydroxyl groups per molecule, preferably 2-5 hydroxyl groups, even more preferably 3 or 4 hydroxyl groups. The polyol is for instance based on a polyether, polyester, or natural oil, and is preferably based on a polyether. The polyol has for instance a hydroxyl number of 150-700 and has for instance average functionality of 3 (number of isocyanate reactive sites per molecule).

For example a polypropylene polyol or polyethylene polyol with hydroxyl number 150-700 and functionality 3 or 4 is used, as these provide for relatively short chain lengths (e.g. molecular weight 300-700 Da). Short chain length may contribute to lower viscosity of the polyol.

In preferred embodiments, the polyol has a viscosity of less than 2000 or less than 1000 mPa·s at 25° C. and typically more than 100 mPa·s at 25° C. Hydroxyl group number is for example measured according to ASTM D 4274-99 or ISO 14900:2017. Viscosity is for instance measured according to ASTM D4878-15 (preferably Method A) or ISO 3219:1993.

The polyol is for instance an aliphatic polyether polyol, such as formed from an initiator and a plurality of alkylene oxide units. The polyol is for instance initiated from a compound with 3 hydroxyl groups such as glycerol, or is for instance amine initiated, or a combination thereof. The polyol is for instance a polyethylene oxide or polypropylene oxide polyol, or other polyether polyol. Polyester polyols can also be used. The number ratio of NCO to OH groups is for example in the range of 0.8:10 to 1.2:10. However, many polyurethane coatings can be used.

The coating components include a polymerization catalyst, for example an organometallic catalyst, tertiary amines, organic or inorganic bases.

Preferably, the polyol and polyisocyanate cure in less than 2 minutes, at 25° C., at 70° C. and/or at the temperature the coating is applied, thereby allowing subsequent application at intervals of less than 2 minutes. The amount and type of catalyst can be adjusted accordingly for such cure time.

The coating components preferably have a reactivity at room temperature of between 25 and 125 seconds (time needed for at least 50% cure) and preferably between 10 and 45 seconds at the operating temperature of the coating unit and/or at 55° C. Preferably, the reactivity at room temperature is measured as described hereinafter under Procedure A) "Procedure for Determining Reactivity Parameters (at 25° C.)—Cup Reactivity"). Preferably the reactivity at operating temperature is measured as described hereinafter under Procedure B ("Procedure for Determining Reactivity Parameters at the Desired Cure Temperature—Hot Plate Reactivity").

In some embodiments, the coating is a polyester coating, more preferably a thermoset polyester coating. The coating components can include an unsaturated polyester (include a carbon-carbon double bond) and a vinyl monomer. The reaction of the curing of step b) can involve copolymerization of the vinyl monomer and the unsaturated polyester. The unsaturated polymer is for example the reaction product of a saturated dicarboxylic acid (or anhydride), an unsaturated dicarboxylic acid (or anhydride) with a polyol, such as a diol (glycol). The glycol is for instance ethylene glycol, propylene glycol, 1,3-butylene glycol, or for example hydrogenated bisphenol A. The glycol is for instance cyclic or acyclic and is for instance aliphatic or aromatic. The glycol has for instance 2-30C atoms. The vinyl monomer is for instance styrene. The reaction during step b) may involve copolymerization of the unsaturated polyester and vinyl monomer, in the presence of for instance a free radical initiator and a catalyst. The unsaturated polyester is for example injected as liquid mixture with the vinyl monomer, wherein the vinyl monomer also acts as solvent for the polyester.

In a further embodiment, the coating is a polyurea coating and the coating components include a polyisocyanate having 2 or more isocyanate groups per molecule and a polyamine having 2 or more amine groups per molecule, preferably 2-5 amine groups, more preferably 3 or 4 amine groups.

In a further embodiment, the coating composition is a phenolic resin coating and the coating components include a phenol and formaldehyde. The phenol component and formaldehyde component can react in the coating unit to form a thermoset polymer.

In a further embodiment, the coating composition is an epoxy coating and the coating components includes an epoxy component (having epoxide groups) and optionally a co-reactant having reactive groups such as a amine, acids and acid anhydrides, phenols, alcohols and thiols. The co-reactant typically has two or more of said reactive groups per molecule, to provide for the formation of a thermoset. polymer. The epoxy component may crosslink through homopolymerisation in step b) or by the reaction with optional co-reactants.

The operation of the coating unit as described advantageously avoids that the particles are crushed during the coating, while at the same time greatly increasing the degree of mixing, such as compared to rotating drum coaters. The coating unit allows for faster reaction times (such as between polyol and polyisocyanate) that provides for batch cycle times that are substantially less than in the prior art. For instance, the entire batch time of a three layer process can be 5-6 minutes, whereas 6-8 minutes per layer can be necessary with a rotating drum. The high intensity mixing and faster reaction times in the inventive method allows for producing coated fertilizer particles without agglomeration of the particles. Furthermore, the reaction rate can be used to optimize the fertilizer release rate by adjusting the type and amount of catalyst used. The coating method is in particular suitable for making coated fertilizer for broad-acre crops such as corn (maize).

The one or more coating components preferably have a reaction time at 25° C. of preferably 30 to 250 s, wherein the reaction time is the time necessary for hardening (optionally measured as Procedure A—"Cup Reactivity" as described herein).

The one or more coating components preferably have a reaction time at the coating temperature (such as at 70° C.) of preferably 10 to 120 seconds, more preferably 10 to 60 seconds, wherein the reaction time is the time necessary for hardening (optionally measured as "Hot Plate Reactivity" as described herein).

The reaction time can be achieved or adjusted by varying the amounts and types of catalysts used for the curing or hardening.

In a preferred embodiment, which does not limit the invention, the coating unit includes a container and a rotor, the coating is a polyurethane coating, and step b) comprises subsequently (after each other, but optionally with further steps before, in between, and/or after):

B1) injecting a polyol into a bed of said fertilizer particles in said container, preferably wherein particles in said bed are lifted by the motion of the container and the rotor, preferably wherein the injecting is with an open pipe or with a spray nozzle, B2) mixing said polyol with said fertilizer particles for 5 to 120 seconds, preferably 10-60 seconds, B3) injecting a polyisocyanate component into said bed of fertilizer particles in said container, preferably wherein the injecting is with an open pipe or a spray nozzle, B4) rolling the fertilizer particles in said container for at least 10 to 300 seconds, preferably 20-180 seconds, thereby allowing the polyol and the polyisocyanate component to react with each other and to at least partially cure the coating layer, while the rotor is also being rotated, B5) optionally injecting a liquid wax into the fertilizer bed, and optionally repeating said steps B1 to B5, B6) optionally rolling the fertilizer in the container for at least 10 seconds thereby allowing the coating to cure further.

In a variant, step B3 is carried out before step B1 and B2 such that the polyisocyanate is injected first. However, the polyol is preferably injected first especially if the polyol is a polymeric compound. In some embodiments, step B5 of injecting the wax is omitted, for instance in at least some of the optional repeats of steps B1-B5. In some embodiments, steps B1-B6 are carried out with other coating components than polyisocyanate and polyol to give different types of coating layers. In steps B1-B6, rolling the fertilizer can be carried out by rotating the container and the rotor. This preferred embodiment was found to give particularly good coating results with desirable release rates of the fertilizer upon immersion in water.

The invention also pertains to a urea finishing plant comprising: a urea finishing unit, such as a granulation unit or a prilling tower, wherein the urea finishing unit has an inlet for urea melt and an outlet for warm urea particles, a coating unit having an inlet connected to said outlet for urea particles, preferably for warm urea particles, wherein the coating unit is as described and comprises a frame and at least two movable elements, wherein said movable elements are independently movable with respect to the frame. Herein "warm urea particles" refers to particles having a temperature above ambient temperature at the inlet of the coating unit, for instance 30 to 95° C., preferably 50-85° C., more preferably, 55-75° C. The connection between the inlet of the coating unit and the outlet of the of the finishing unit preferably does not. include a cooling unit between the urea finishing unit and the inlet of the coating unit, especially not a cooling unit using cooling air, such as a cooling unit including blowers or fans for cooling air.

The movable elements are preferably a container and an agitating member as described, more preferably a container having a wall and an interior space for accommodating fertilizer particles to be coated, and preferably an agitating member, arranged in the interior space of the container. The agitating member is preferably a rotor as described. The coating unit furthermore comprises an outlet for coated urea particles. The plant also comprises a cooling unit. The cooling unit has an inlet connected to said outlet. for coated urea particles, and an outlet for cooled coated urea particles, and preferably furthermore has an inlet for cooling air and an outlet for waste air. The plant can be used for carrying out the method of the invention. The method of the invention can also be carried out by obtaining fertilizer particles from storage and e.g. preheating if necessary.

The invention also pertains to the fertilizer particles obtainable with the method of the invention. These fertilizer particles exhibit an advantageous release rate. An example of the advantageous release rate is given in Example 3. The fertilizer particles obtainable with the described method comprise for instance urea, such as at least 50 wt. % urea based on total weight of the coated fertilizer particles. The coating of the particles is for instance a polyurethane coating. Preferably, the fertilizer particles obtainable with the described method have a release rate of less than 40% after 20 days of immersion in water, such as measured as according to procedure C as described herein. Preferably the release rate is furthermore less than 20 wt. % at 7 days of immersion. The preferred use of water-insoluble polymers may advantageously contribute to achieving such release rates. The total coating amount is for example 5-25 wt. % or 10-20 wt. % based on weight of the fertilizer particles to be coated without any coating. The number of coating layers is e.g. 1-12 layers, such as 4-8 layers, wherein wax layers are counted as separate layers. The particles comprise for instance 3 polyurethane layers and 3 wax layers, giving in total 6 layers. The coating for instance include 2 to 6 polyurethane layers, which are for example separated from each other by wax layers.

The invention also pertains to coated fertilizer particles, preferably comprising urea, more preferably comprising at. least 50 wt. % urea based on weight of the coated fertilizer particles, that have a release rate of less than 40% after 20 days of immersion in water, such as measured as according to Procedure C ("Procedure for Determining the Rate of Nutrient Release from a Controlled Release Fertilizer") as described herein. Preferably the release rate is furthermore less than 20 wt. % at 7 days of immersion. The coating of the coated fertilizer particles is for example a polyurethane coating. The particles for instance have the coating in an amount and number of layers as described hereinabove.

Without wishing bound by way of theory, the coating method of the invention may provide for a homogenous coating layer with high or complete coverage of the fertilizer particles.

Figure 1:
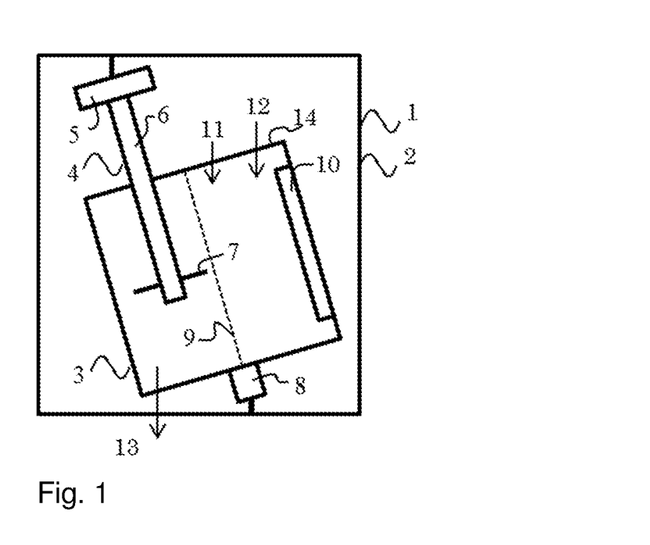
FIG. 1 schematically illustrates an example coating unit that can be used in the inventive method.

FIG. 1 schematically illustrates an example coating unit that can be used in the method of the invention. The coating unit 1 contains a frame 2 that is a casing, and a container 3 and a rotor 4. The rotor 4 is connected to a motor 5 for driving the rotor 4. The rotor 4 comprises a shaft 6 provided with blades 7. The container 3 is provided with a further motor 8 and has a rotation axis 9. The rotation axis 9 is parallel to and spaced apart from (the midline of) shaft 6. The container 3 also has a scraper 10 in the proximity of the container wall but which can remain static while the container 3 spins around axis 9. The container 3 includes a cover plate 14 and shaft 6 extends through the cover plate. The container also has an inlet 11 for fertilizer particles and one or more inlets 12 for coating components. Inlet 12 is for instance implemented as an open pipe, or as one or more spray nozzles, wherein each spray nozzle has for instance one connection to feed line for one specific coating component. The container 3 also has an outlet 13 for coated fertilizer particles, e.g. implemented as closable aperture in the bottom of the container 13.

The invention will now be further illustrated by the following examples which do not limit the invention or the claimed subject-matter.

EXAMPLE 1

A mixer as described (with a rotating container and rotating rotor) was preheated to about 75° C. and 4.08 kg of urea fertilizer particles was added and agitation started. Once the urea was confirmed to be at about 75° C. the first of three polyol charges of 14.0 g was added and mixed for 30 seconds before the first of three isocyanate charges of 21.3 g was added. After mixing for 60 seconds the first of two wax charges of 10.2 g was added. The material was allowed to mix for an additional 30 seconds. The polyol, isocyanate, and wax addition steps and mixing times were repeated. Finally the third charge of polyol and isocyanate were added with the appropriate mixing times.

Unlike the previous two coating layers, after the third charge of the urethane components (polyol charge and isocyanate charge) the addition of a wax layer was omitted. Optionally a layer of wax could have been applied on the third polyurethane coating layer. The urea, which was free flowing and free of clumps or agglomerations, was dispensed from the mixer to cool. The total batch time for this three layer process was 5.5 minutes; a considerable reduction from the state-of-the-art reported batch times which generally require 6-8 minutes per layer. The coating was 3 wt. %, the final weight was 4.21 kg of which 126 g coating. Wax was applied at 0.5% with 2 layers only and 3 coating steps were used. The fertilizer particles were completely covered by the coating based on visual inspection.

EXAMPLE 2

Polyol formulations A-G were prepared by adding an organometallic catalyst or a tertiary amine catalyst to a poly-ether polyol in increasing amounts of catalyst as shown in Table 1.

Table 1 shows the respective room temperature and elevated temperature reactivity of the polyol blends when compounded with a multifunctional aromatic isocyanate based upon MDI. These samples were formulated to have a reactivity ranging from a fast reactivity time of 8 seconds to a very slow reaction time of longer than 5 minutes. At the processing temperature of about 75° C. the reaction times were substantially faster. If an entry of N/A is recorded that means the sample reacted during the 20 second mixing time or essentially as soon as it was added to the hot plate.

The polyols were added to preheated urea particles being agitated in a mixer as described, in accordance with Example 1. The reaction parameters were a process temperature of 71° C. (160 F.), a total urethane coating weight of 3% (added via three separate layers of 1% each with the polyol added first then the isocyanate), and 0.5% total wax added via two separate layers after the first and second urethane coating layers.

TABLE 1

| Polyol Blend | Cup Reactivity Time (sec) | 71° C. Reaction Time (sec) |
|---|---|---|
| A | >300 | 1140 |
| B | 217 | 65.53 |
| C | 90 | 38.03 |
| D | 43 | 16.47 |
| E | 25 | <5 sec |

TABLE 1-continued

| Polyol Blend | Cup Reactivity Time (sec) | 71° C. Reaction Time (sec) |
|---|---|---|
| F | 21 | N/A |
| G | 8 | N/A |

Figure 2:
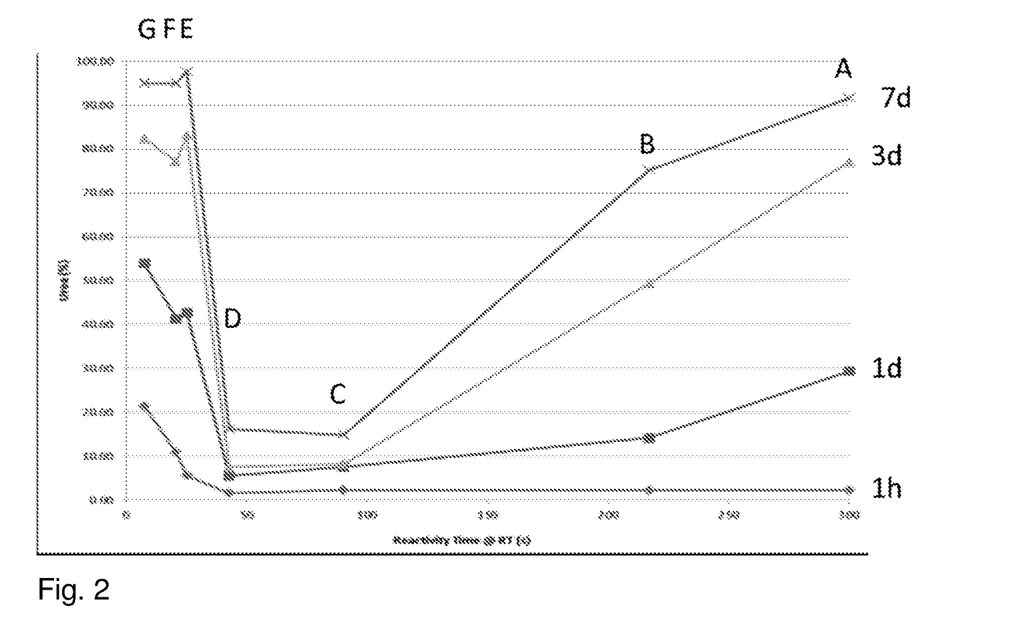
FIG. 2 shows experimentally obtained urea release rates of fertilizer particles prepared with a method according to the invention with coating compositions having different reactivity time values.

FIG. 2 shows the % urea released (0 to 100%, Y-axis; measured according to Procedure C) at 2 hours, and 1, 3 and 7 day immersion, for the different polyol blends of Table 1 (polyol blends on X-axis according to reactivity time at room temperature in seconds). A desirable slower release is achieved with polyol blends D, C and B, best with blends C and D. The release rate depends on the reactivity of the polyol blends which was modified by using different amounts and types of catalyst.

EXAMPLE 3

Additionally, polyol blends C and D were also applied to fertilizer particles using a comparative rotating drum mixer following the same addition sequence and mix times but the material charges were decreased to reflect the lower charge of fertilizer particles. The release rate was determined according to Procedure C.

Figure 3:
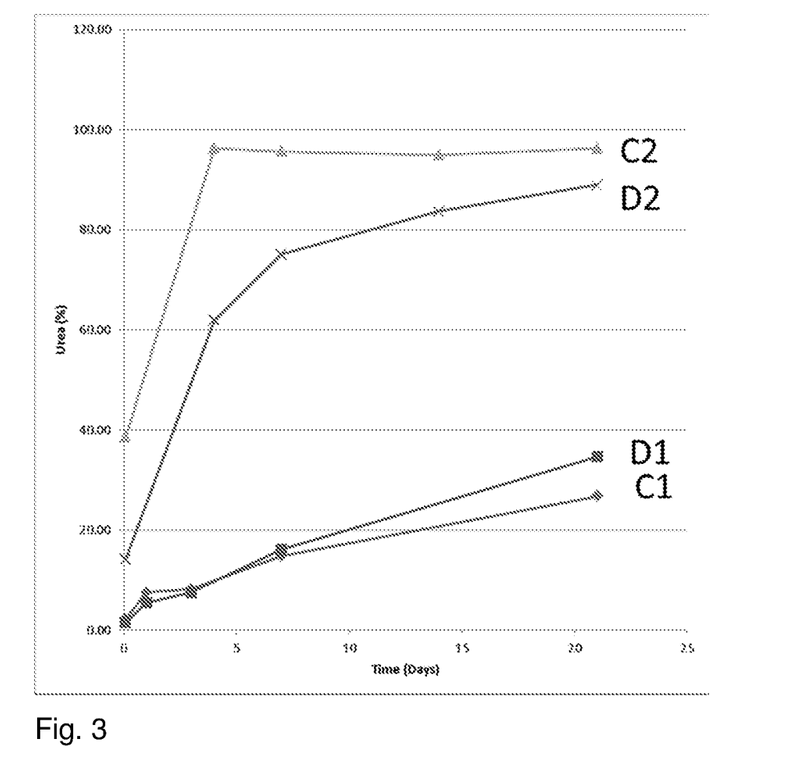
FIG. 3 shows experimentally obtained urea release time profiles for two fertilizers coated according to the inventive method and two fertilizers coated according to a comparative method with a rotary drum coater.

FIG. 3 shows the urea release % (y-axis) at 2 hours, and 1, 3, 7, 14 and 21 days (x-axis, time in days) immersion for blends C and D applied with the coating unit as described (C1, D1) and with the comparative rotating drum (C2, D2). The release rates from the inventive mixer are substantially better (slower) than the rotating drum mixer. For C2 and D2, more than 60% urea was released in less than 3 days immersion. For C1 and D1, less than 40% urea was released at 21 days immersion. This indicates that the faster reactivity is not beneficial to the comparative coated fertilizer produced with comparative rotating drum mixer method while it is very advantageous for the inventive method and inventive urea particles.

Experimental Procedures

In Example 2 the following procedures were used.

Procedure A: Procedure for Determining Reactivity Parameters (at 25° C.)—Cup Reactivity Add required weights of the fully formulated component to achieve 150 in a small cup. Immediately and simultaneously start a timer and start mixing the compounds. Continue mixing for 20 seconds or until the material solidifies if it is less than 20 seconds.

To check for the reaction time, periodically lightly touch a stainless steel spatula (or alternately a wood tongue depressor) to the surface of the material. When the spatula hits a hard, or cured, spot on the surface of the material that is considered the reaction time. In Example 2, fully formulated Isocyanate component (A-component) and the fully formulated Polyol component (B-component), including any optional additives, necessary to achieve 150 g were added into a small cup. The chemical components and apparatus are initially all at 25° C. The B-component is first weighed into the mixing container, followed by the A-component, at the appropriate weight ratio of the components.

Procedure B: Procedure for Determining Reactivity Parameters at the Desired Cure Temperature—Hot Plate Reactivity Place a small mold capable of holding 2 ml of mixed material in a cavity of ⅛ in depth on a hot plate and preheat the mold to the desired temperature. Once the desired temperature has been confirmed, follow the mixing procedure mentioned as Procedure A—Cup Reactivity but now as soon as the sample has been fully mixed pour 2 ml of the reaction mixture into the cavity of the preheated mold. Start the timer immediately after adding the resin to the mold. Using the spatula periodically touch the surface of the material; the reaction time is the time at which the resin solidifies into a hard material.

Procedure C: Procedure for Determining the Rate of Nutrient Release from a Controlled Release Fertilizer Nutrient solutions, prepared by dissolving a variety of known concentrations of nutrient in distilled water, are prepared. The refractive index of the known concentrations is measured with a refractometer so that a calibration curve of refractive index vs concentration may be constructed. Then, 10 g of coated fertilizer particles is accurately weighed into a small jar and 90 g of water is added. The sample is gently swirled and allowed to rest until the required measurement time. Before each new measurement the sample is gently swirled to insure uniformity. A small sample of the solution is placed on the refractometer and the measurement recorded. Comparison to the calibration curve gives the nutrient concentration in the solution. The percentage of nutrient released from the coated fertilizer particles is calculated. The experiment. was carried out at ambient temperature, e.g. 20° C.

The invention claimed is:

1. A method of coating fertilizer particles with a coating, wherein the method comprises:
   a) providing fertilizer particles in a coating unit,
   b) a step of applying a coating layer comprising:
       applying one or more coating components to the fertilizer particles in the coating unit to provide coated fertilizer particles comprising a coating layer and the fertilizer particles,
       and at least partially curing or hardening the coating layer, wherein said curing or hardening involves a chemical reaction of said one or more coating components,
   wherein step b) is performed one or more times to provide coated fertilizer particles, and
   c) discharging the coated fertilizer particles from the coating unit, or performing a final cure or hardening of the coated fertilizer particles in the coating unit and subsequently releasing the fertilizer particles from the coating unit, wherein the discharged fertilizer particles comprise said coating, wherein the coating comprises a polymer,
   wherein the coating unit comprises a stationary frame and at least two movable elements, wherein said movable elements are independently movable with respect to the frame, and wherein the method comprises moving said at least two movable elements with respect to the frame during at least step b);
   wherein a first movable element of said movable elements is a container having a wall and an interior space for accommodating fertilizer particles, wherein the method comprises spinning the container in a rotating motion around a rotation axis while the container holds the fertilizer particles during at least step b); and
   wherein a second movable element of said movable elements is an agitating member, which is arranged in the interior space of the container, and wherein the method comprises moving the agitating member simultaneously with spinning the container, during at least step b).

2. A method according to claim 1, wherein the agitating member is a rotor, and wherein the method comprises rotating the rotor around a rotation axis of the rotor simultaneously with spinning the container, during at least step b).

3. A method according to claim 2, wherein said rotation axis of the rotor and said rotation axis of the container are parallel to each other or have an included angle of less than 30° with each other, and wherein said rotation axis of the rotor and said rotation axis of the container are spaced apart from each other, such that the rotor is mounted eccentrically in the interior space of the container.

4. A method according to claim 3, wherein said rotor comprises a shaft and one or more blades, wherein said shaft has a first end and a second end, wherein said first end is arranged in said interior space of said container, and wherein said second end is connected to an actuator, wherein said blades are connected to said shaft and extend from said shaft in said interior space of the container in a direction perpendicular to the length of the shaft.

5. A method according to claim 2, wherein said coating is a polyurethane coating, and wherein step b) comprises subsequently:
   B1) injecting a polyol into a bed of said fertilizer particles in said container,
   B2) mixing said polyol with said fertilizer particles for 5 to 120 seconds
   B3) injecting a polyisocyanate component into said bed of fertilizer particles in said container,
   B4) rolling the fertilizer particles in said container for at least 10 to 300 seconds, thereby allowing the polyol and the polyisocyanate component to react with each other, while the rotor is also being rotated,
   B5) injecting a liquid wax into the fertilizer bed, and optionally repeating said steps B1 to B5,
   B6) optionally rolling the fertilizer in the container for at least 10 seconds thereby allowing the coating to cure further.

6. A method according to claim 1, wherein said coating of said discharged particles comprises a crosslinked or thermoset polymer.

7. A method according to claim 6, wherein in step b) a coating layer is applied in an amount of 0.50-4.0 wt. % based on the weight of the fertilizer particle to be coated without coating, and
   wherein step b) is carried out in 10 to 600 seconds,
   and wherein the final cure of step c), if carried out, is carried out in 60 seconds to 15 minutes.

8. The method according to claim 7 wherein step b) is carried out in 30 to 240 seconds.

9. A method according to claim 6, wherein said coating is a polyurethane coating and wherein said coating components comprise a polyisocyanate component and a polyol.

10. A method according to claim 1, wherein the rotation axis of the container is inclined with respect to a vertical axis, wherein the vertical axis is defined with respect to gravity.

11. A method according to claim 1 wherein the container has a bottom and a wall, wherein the coating unit furthermore comprises a scraper, the scraper being stationary with respect to the frame during at least step b), wherein the scraper is arranged for scraping material from the wall and/or from the bottom of the container.

12. A method according to claim 1, wherein steps a) and b) are carried out at a temperature of at least 50° C., and wherein step c) comprises cooling the discharged particles from a temperature of at least 50° C. to a lower temperature.

13. A method according to claim 1, wherein the coating comprises a water-insoluble polymer.

14. A urea finishing plant comprising:
- a urea finishing unit, wherein the urea finishing unit has an inlet for urea melt and an outlet for warm urea particles,
- a coating unit having an inlet connected to said outlet for warm urea particles, the coating unit comprising a stationary frame and at least two movable elements, wherein said movable elements are independently movable with respect to the frame,
- wherein a first movable element of said movable elements is a container having a wall and an interior space for accommodating fertilizer particles to be coated,
- wherein a second of said movable elements is an agitating member, arranged in the interior space of the container,
- wherein the coating unit furthermore comprises an outlet for coated urea particles,
    - and a cooling unit having an inlet connected to said outlet for coated urea particles, and further having outlet for cooled coated urea particles.

15. The urea finishing plant according to claim 14, wherein the cooling unit has an inlet for cooling air and an outlet for waste air.

16. The urea finishing plant according to claim 14, wherein the urea finishing unit is a granulation unit.

17. The urea finishing plant according to claim 14, wherein the urea finishing unit is a prilling tower.

* * * * *